(12) United States Patent
Miyairi et al.

(10) Patent No.: US 7,927,551 B2
(45) Date of Patent: Apr. 19, 2011

(54) CATALYTIC BODY AND MANUFACTURING METHOD OF THE SAME

(75) Inventors: Yukio Miyairi, Nagoya (JP); Naomi Noda, Ichinomiya (JP); Mikio Makino, Nagoya (JP); Shinichi Miwa, Tajimi (JP)

(73) Assignee: NGK Insulators, Ltd., Nagoya (JP)

( * ) Notice: Subject to any disclaimer, the term of this patent is extended or adjusted under 35 U.S.C. 154(b) by 539 days.

(21) Appl. No.: 11/727,529

(22) Filed: Mar. 27, 2007

(65) Prior Publication Data
US 2007/0269352 A1 Nov. 22, 2007

(30) Foreign Application Priority Data

Apr. 7, 2006 (JP) ................................ 2006-106997
Mar. 12, 2007 (JP) ................................ 2007-062576

(51) Int. Cl.
*B01D 50/00* (2006.01)
(52) U.S. Cl. ........ 422/168; 502/305; 502/308; 502/309; 502/312; 502/313; 502/317; 502/325; 502/349; 502/350; 502/353; 264/42
(58) Field of Classification Search ............... 502/305, 502/325, 349, 353, 308, 309, 312, 313, 317, 502/350; 422/168; 264/42
See application file for complete search history.

(56) References Cited

U.S. PATENT DOCUMENTS

| | | |
|---|---|---|
| 2002/0183191 A1 | 12/2002 | Faber et al. |
| 2003/0059359 A1 | 3/2003 | Morita et al. |
| 2004/0166035 A1 | 8/2004 | Noda et al. |
| 2006/0185335 A1* | 8/2006 | Ichikawa ........................ 55/523 |

FOREIGN PATENT DOCUMENTS

| | | |
|---|---|---|
| DE | 42 15 481 A1 | 11/1993 |
| DE | 10 2005 024 124 A1 | 11/2006 |
| EP | 0 470 340 A1 | 2/1992 |
| EP | 0 736 503 A1 | 10/1996 |
| EP | 1 340 541 A1 | 9/2003 |
| JP | A 2003-033664 | 2/2003 |
| JP | 2005262210 A * | 9/2005 |

* cited by examiner

*Primary Examiner* — Jerry Lorengo
*Assistant Examiner* — Pritesh Darji
(74) *Attorney, Agent, or Firm* — Oliff & Berridge, PLC

(57) ABSTRACT

There is disclosed a catalytic body with purifying efficiency and smaller pressure loss and its manufacturing method. Provided is a catalytic body wherein a porous honeycomb structure including partition walls defining a plurality of cells acting as fluid passages which extend through the honeycomb structure from one end surface to the other end surface thereof is formed of at least one type of (a) a catalytic substance and (b) a substance including an oxide and at least one type of noble metal carried on the oxide. The catalytic converter is characterized in that (c) 10% or more of a plurality of cells are plugged by plugging parts formed at one ends or in the middles of passages, that (d) the average pore diameter of the honeycomb structure is 10 μm or more, or that (e) the porosity is 40% or more.

15 Claims, 10 Drawing Sheets

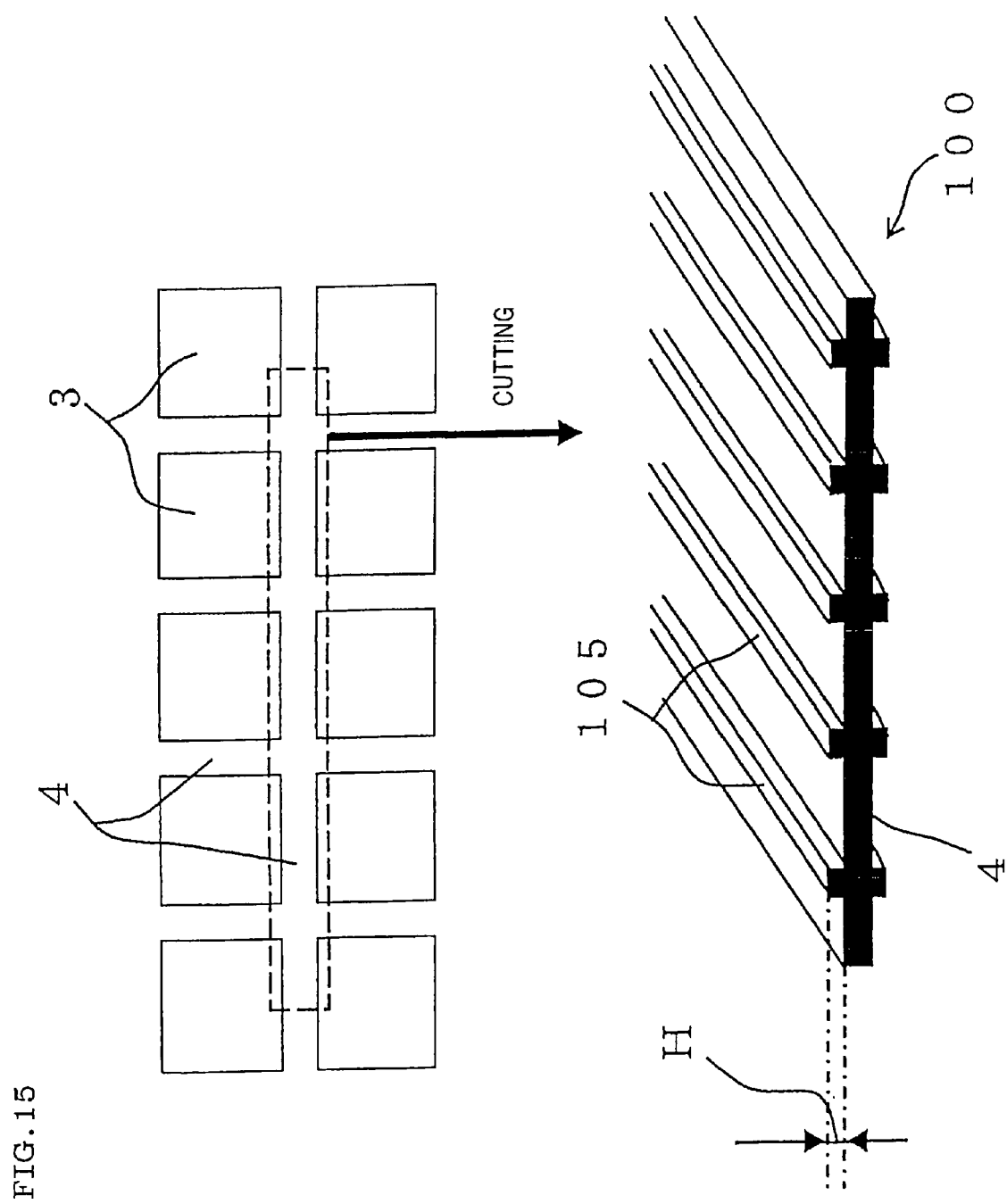

CATALYTIC BODY AND MANUFACTURING METHOD OF THE SAME

BACKGROUND OF THE INVENTION

1. Field of the Invention

The present invention relates to a catalytic body preferably used for purification of components to be purified such as carbon monoxide (CO), hydrocarbon (HC) and nitrogen oxide (NOx) contained in exhaust gas emitted from automobile engines, construction machine engines, industrial stationary engines, combustion devices, or the like, and its manufacturing method.

2. Description of the Related Art

Currently, a catalytic body utilizing a honeycomb structure as a catalyst carrier is used in order to purify exhaust gas emitted from various types of engines or the like. The catalytic body has a structure in which a catalyst coating layer 5 is carried on the surface of partition walls 4 defining cells 3 of a honeycomb structure, as shown in FIG. 13. The catalyst coating layer 5 mainly comprises an oxide such as alumina, ceria, or zirconia and a noble metal such as platinum, rhodium, or palladium is carried thereon as a catalytic active component. As shown in FIGS. 13 and 14, to purify exhaust gas by using the catalytic body 60 (honeycomb structure 11), exhaust gas flows into the cells 3 from the side of one end surface 2a so as to come into contact with the catalyst coating layer 5 on the inner surface of the partition walls 4, and then flows out of the cells from the side of the other end surface 2b to the outside (for example, refer to Patent document 1).

In case where exhaust gas is purified using such a honeycomb catalytic body, it is necessary to promote, as much as possible, the transmission of components to be purified contained in the exhaust gas from the exhaust gas toward the catalyst coating layer on the surface of the partition walls in order to enhance the purifying efficiency. To enhance the purifying efficiency, it is necessary to reduce the hydraulic diameter of cells and increase the surface area of partition walls. In particular, a method is employed for increasing the number of cells per unit area (cell density).

However, enhancing the cell density and reducing the hydraulic diameter of cells do not actually deliver full catalyst performance, and in order to further enhance the catalyst performance, there has recently been practiced a research for applying a honeycomb structure with plugged cells, such as one used in a diesel particulate filter (DPF), where the ends of cells are alternately plugged at one end surface and the other end surface of the honeycomb structure (so that each end surface of the honeycomb structure will appear in a zigzag pattern), to the catalyst carrier of the catalytic body.

That is, in a honeycomb structure where cells are plugged as described above, since exhaust gas flowing into the cells from the side of one end surface passes through porous partition walls and flows out of the cells from the side of the other end surface, if a catalyst coating layer including a catalytic active component such as a noble metal is coated on the inner surfaces of the fine pores in the partition walls through which exhaust gas passes, it is possible that the exhaust gas contacts the catalyst coating layer inside the fine pores of the partition walls to thus perform the purification of the exhaust gas. In a catalytic body having such a structure, the exhaust gas flows in the fine pores in the partition walls whose hydraulic diameter is smaller than that of a cell so that it is possible to reduce the distance between the exhaust gas and the catalyst coating layer and increase the contact area between the exhaust gas and the catalyst coating layer, with the result that drastic improvement of the catalyst performance is expected.

In the actual preparation of such a catalytic body, however, it is extremely difficult to uniformly coat a catalyst coating layer on the inner surfaces of the fine pores in the partition walls, and problems arise in that if the uniformity of a catalyst coating layer is not ensured, the catalyst performance is not fully achieved. Also, if an attempt is made to uniformly and thinly coat a catalyst coating layer on the inner surfaces of the fine pores in the partition walls, the volume of the catalyst coating layer itself, that is, the absolute quantity of an oxide constituting the catalyst coating layer is limited. Or, the distance between noble metal particles carried in or on the catalyst coating layer is insufficient so that the noble metal particles start to coagulate while the catalytic body is in use, which reduces the total surface area of the noble metal particles thus degrading the catalytic activity. On the other hand, if an attempt is made to sufficiently maintain an absolute quantity of the catalyst coating layer, the fine pores in the partition walls are excessively buried with the catalyst coating layer, and thus the passage resistance of exhaust gas grows excessively.

[Patent document 1] JP-A-2003-33664

SUMMARY OF THE INVENTION

The present invention has been accomplished in view of the problems with the prior art, and an object of the present invention is to provide a catalytic body with excellent purifying efficiency and smaller pressure loss and its manufacturing method.

In order to attain the object, the present invention provides the following catalytic body and its manufacturing method.

[1] A catalytic body comprising a porous honeycomb structure including partition walls defining a plurality of cells acting as fluid passages which extend through the honeycomb structure from one end surface to the other end surface thereof, the honeycomb structure being formed of at least one type of:

(a) a catalytic substance comprising at least one type selected from a group consisting of titania, tungsten oxide, vanadium oxide, and zeolite; and (b) a substance comprising at least one type of oxide selected from a group consisting of alumina, ceria, titania, silica, and zirconia, and at least one type of noble metal carried on the at least one type of oxide and selected from a group consisting of silver, platinum, rhodium, and palladium;

wherein 10% or more of the plurality of cells are plugged by plugging parts formed at least either at one ends of the cells or in the middles of the passages.

[2] The catalytic body according to the invention [1], wherein 50% or more of the plurality of cells are plugged by plugging parts formed at least either at one ends of the cells or in the middles of the passages.

[3] A catalytic body comprising a porous honeycomb structure including partition walls defining a plurality of cells acting as fluid passages which extend through the honeycomb structure from one end surface to the other end surface thereof, the honeycomb structure being formed of at least one type of:

(a) a catalytic substance comprising at least one type selected from a group consisting of titania, tungsten oxide, vanadium oxide, and zeolite; and (b) a substance comprising at least one type of oxide selected from a group consisting of alumina, ceria, titania, silica, and zirconia, and at least one type of noble metal carried on the at least one type of oxide and selected from a group consisting of silver, platinum, rhodium, and palladium;

wherein an average pore diameter of the honeycomb structure is 10 μm or more.

[4] The catalytic body according to the invention [3], wherein the average pore diameter of the honeycomb structure is 40 μm or more.

[5] A catalytic body comprising a porous honeycomb structure including partition walls defining a plurality of cells acting as fluid passages which extend through the honeycomb structure from one end surface to the other end surface thereof, the honeycomb structure being formed of at least one type of:

(a) a catalytic substance comprising at least one type selected from a group consisting of titania, tungsten oxide, vanadium oxide, and zeolite; and (b) a substance comprising at least one type of oxide selected from a group consisting of alumina, ceria, titania, silica, and zirconia, and at least one type of noble metal carried on the at least one type of oxide and selected from a group consisting of silver, platinum, rhodium, and palladium; wherein a porosity is 40% or more.

[6] The catalytic body according to the invention [5], wherein the porosity is 50% or more.

[7] The catalytic body according to any one of the inventions [1] to [6], wherein the zeolite is at least one type of a noble metal carrying zeolite and a transition metal carrying zeolite.

[8] The catalytic body according to the invention [7], wherein the zeolite is at least one type of a noble metal ion-exchange zeolite and a transition metal ion-exchange zeolite.

[9] The catalytic body according to any one of the inventions [1] to [8], wherein a thickness of the partition wall is 60 μm or more.

[10] A method for manufacturing a catalytic body comprising a porous honeycomb structure including partition walls defining a plurality of cells acting as fluid passages which extend through the honeycomb structure from one end surface to the other end surface thereof, the honeycomb structure being formed of at least one type of:

(a) a catalytic substance comprising at least one type selected from a group consisting of titania, tungsten oxide, vanadium oxide, and zeolite; and (b) a substance comprising at least one type of oxide selected from a group consisting of alumina, ceria, titania, silica, and zirconia, and at least one type of noble metal carried on the at least one type of oxide and selected from a group consisting of silver, platinum, rhodium, and palladium; wherein the method comprises the steps of:

performing extrusion molding a catalyst material in the form of a plastical body including at least one type of organic and inorganic pore forming agents mixed therein by using a ferrule to obtain a honeycomb-shaped catalyst material; and raising a temperature of the honeycomb-shaped catalyst material to a predetermined temperature during or after a drying process of the honeycomb-shaped catalyst material to remove the pore forming agent by oxidation or densify the pore forming agent to thus form fine pores in the catalyst partition walls.

According to the present invention, there are provided a catalytic body with excellent purifying efficiency and smaller pressure loss and its manufacturing method.

BRIEF DESCRIPTION OF THE DRAWINGS

FIG. 15 is a schematic view of a test specimen used for measurement of permeability.

DESCRIPTION OF THE PREFERRED EMBODIMENT

While the best mode embodiments of the present invention will be described, it is to be understood that the present invention is not limited to these embodiments but variations to or improvements of the embodiments made as required based on the ordinary knowledge of those skilled in the art without departing from the spirit of the invention are also within the scope of the present invention.

In a catalytic body according to the invention, a honeycomb structure composed of a catalyst material is a porous honeycomb structure including partition walls defining a plurality of cells acting as fluid passages which extend through the honeycomb structure from one end surface to the other end surface thereof, wherein 10% or more, preferably 50% or more of the plurality of cells are plugged by plugging parts formed at least either at one end of the cells or in the middle of the passages. By plugging in this way, at least part of exhaust gas flowing into cells from one end surface of the honeycomb structure passes through partition walls and flows out from the other end. In case where the cells plugged in the above-described manner occupy less than 10% of all cells, the quantity of exhaust gas passing through partition walls is small and thus a sufficient purification effect is not obtained. In case where the purification effect is given importance, 100% is appropriate.

FIGS. 2A to 7 are schematic views illustrating exemplary embodiments of a honeycomb structure used for the present invention.

Figure 2A:
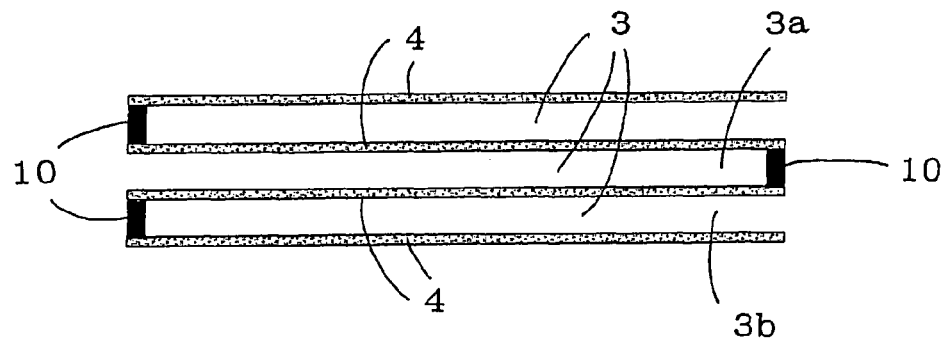
FIG. 2A is a longitudinal sectional view of the catalytic body according to one embodiment of the invention.
Figure 2B:
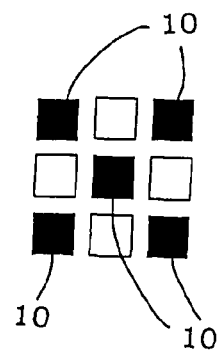
FIG. 2B is a transverse sectional view of the catalytic body according to one embodiment of the invention.

In the embodiment shown in FIGS. 2A and 2B, one ends of cells 3 are plugged by plugging parts 10 alternately at the inlet end surface and the outlet end surface, so that exhaust gas that has flowed into a cell 3a plugged at the outlet end surface is interrupted by the plugging part 10 and passes through the partition wall 4 into an adjacent cell 3b plugged at the inlet end surface, and then flows to the outside.

Figure 3:
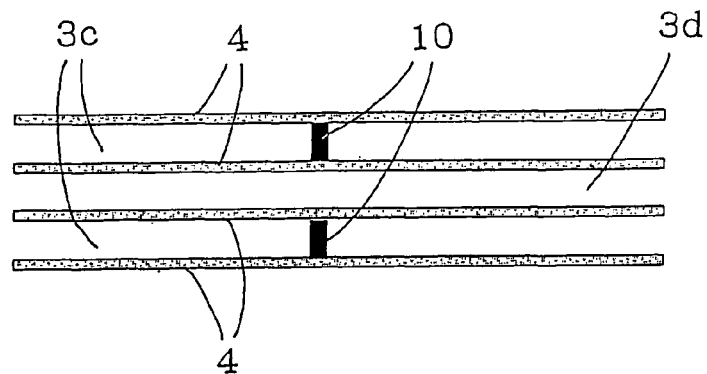
FIG. 3 is a longitudinal sectional view of a catalytic body according to a second embodiment of the invention.

In the embodiment shown in FIG. 3, cells 3c plugged by the plugging parts 10 and non-plugged cells 3d are arranged alternately. The plugging parts 10 are arranged in the middles of the passages rather than at one ends of the cell s. Exhaust gas that has flowed into the plugged cell 3c in the middle of the passage passes through the partition wall 4 before the plugging part 10 and moves into the adjacent non-plugged cell 3d. The exhaust gas that has moved into the non-plugged cell 3d partially flows to the outside from the outlet end of the cell 3d. The remaining exhaust gas passes through the partition wall 4 again and returns to the plugged cell 3c and flows to the outside from the outlet end of the cell 3c. Part of the exhaust gas that has flowed into the non-plugged cell 3d is discharged without passing through the partition wall 4. Such exhaust gas is also purified to some degree while coming into contact with the partition wall 4. By providing the non-plugged cells 3d partially among all the cells 3, it is possible to reduce the pressure loss.

Figure 4:
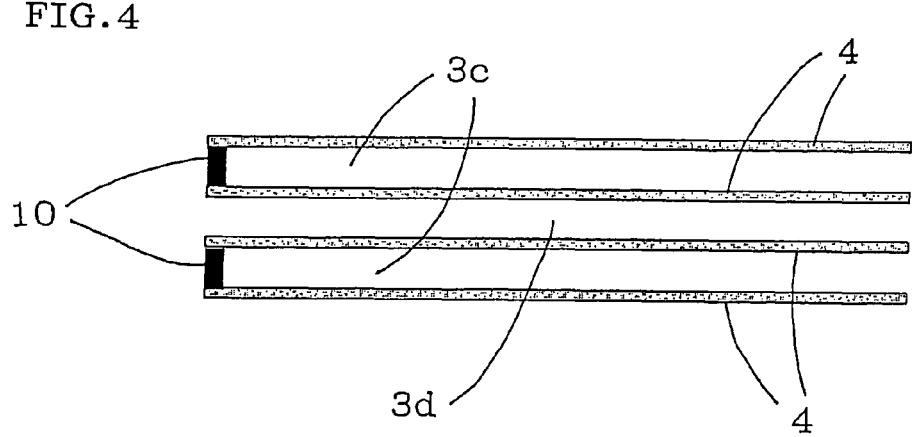
FIG. 4 is a longitudinal sectional view of a catalytic body according to a third embodiment of the invention.

In the embodiment shown in FIG. 4, cells 3c plugged by the plugging parts 10 and non-plugged cells 3d are arranged alternately, with the plugging parts 10 arranged only at the inlet ends of the cells. Part of exhaust gas that has flowed into the non-plugged cell 3d passes through the partition wall 4 in the middle of the passage and moves into an adjacent plugged cell 3c and flows to the outside from the outlet end of the cell 3c. The remaining exhaust gas is discharged without passing through the partition wall 4. Such exhaust gas is also purified to some degree while coming into contact with the partition wall 4. By providing the non-plugged cells 3d partially among all the cells 3, it is possible to reduce the pressure loss, same as the embodiment shown in FIG. 3.

Figure 5:
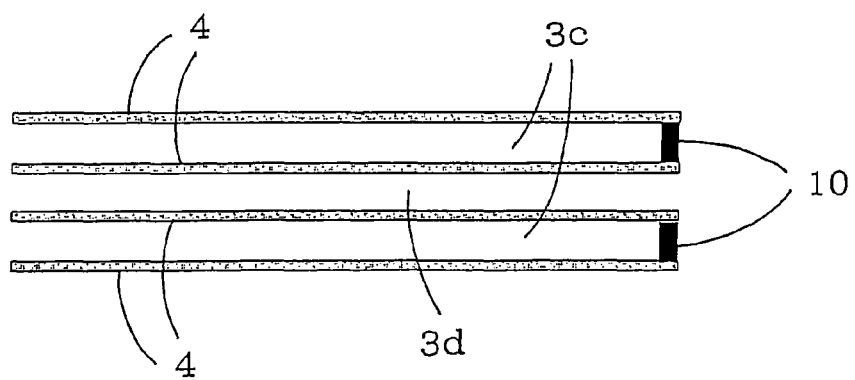
FIG. 5 is a longitudinal sectional view of a catalytic body according to a fourth embodiment of the invention.

In the embodiment shown in FIG. 5, cells 3c plugged by the plugging parts 10 and non-plugged cells 3d are arranged alternately, with the plugging parts 10 arranged only at the outlet ends of the cells. Exhaust gas that has flowed into the plugged cell 3c passes through the partition wall 4 before the plugging part 10 and moves into the adjacent non-plugged cell 3d. Most portion of exhaust gas that has flowed into the non-plugged cell 3d is discharged to the outside without passing through the partition wall 4. Such exhaust gas is also purified to some degree while coming into contact with the partition wall 4. By providing the non-plugged cells 3d partially among all the cells 3, it is possible to reduce the pressure loss, same as the embodiments shown in FIGS. 3 and 4.

Figure 6:
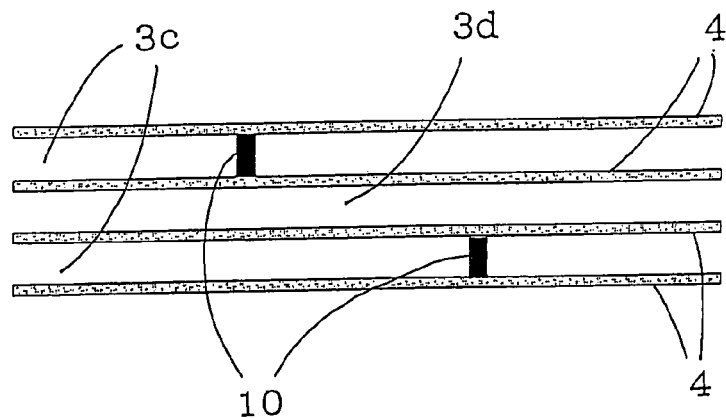
FIG. 6 is a longitudinal sectional view of a catalytic body according to a fifth embodiment of the invention.

In the embodiment shown in FIG. 6, same as that shown in FIG. 3, cells 3c plugged by the plugging parts 10 and non-plugged cells 3d are arranged alternately and the plugging parts 10 are arranged in the middles of the passages rather than at one ends of the cells. While the positions of the plugging parts 10 are the same in the longitudinal direction of the cells in the embodiment shown in FIG. 3, the positions of the plugging parts 10 are shifted in the longitudinal direction of the cells in this embodiment. The flow rate of exhaust gas passing through the partition wall 4 tends to increase just before the plugging part 10. In case where the positions of the plugging parts 10 in the longitudinal direction of the cells are the same as shown in FIG. 3, the flow of exhaust gas passing through the partition wall 4 and moving into the adjacent non-plugged cell 3c concentrates on a predetermined section of the cell 3c. In case where the positions of the plugging parts 10 in the longitudinal direction of the cells are shifted as shown in FIG. 6, the passage points of exhaust gas passing through the partition walls 4 and moving into the adjacent non-plugged cells 3c are varied, thus relaxing the concentration of exhaust gas on the predetermined sections of the cells 3c. This further lowers the pressure loss and smoothes the flow of fluid in the cells. The length of shift is preferably 0.5 mm or more considering a preferable relaxation effect, and more preferably 1.0 mm or more. In terms of a ratio to the entire length of a honeycomb structure, a ratio of 0.5% or more is preferable and 1.0% or more is more preferable.

Figure 7A:
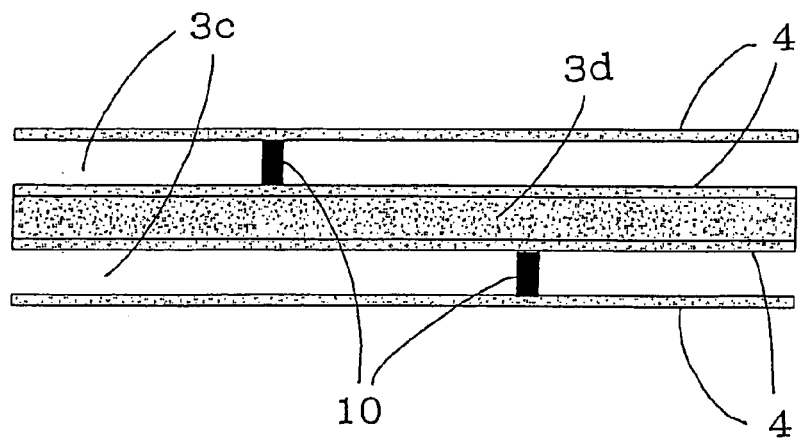
FIG. 7A is a longitudinal sectional view of the catalytic body according to a sixth embodiment of the invention.
Figure 7B:
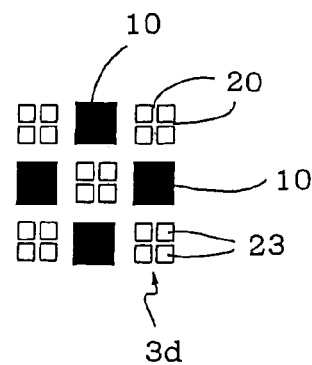
FIG. 7B is a transverse sectional view of the catalytic body according to a sixth embodiment of the invention.

In the embodiment shown in FIGS. 7A and 7B, same as that shown in FIG. 6, cells 3c plugged by the plugging parts 10 and non-plugged cells 3d are arranged alternately and the plugging parts 10 are arranged in the middles of the passages of the cells. The positions of the plugging parts 10 are shifted in the longitudinal direction of the cells in this embodiment. Moreover, the non-plugged cell 3d is split into four sub-cells 23 by way of partition walls 20. Most portion of exhaust gas that has flowed into the non-plugged cell 3d is discharged to the outside without passing through the partition walls 4. Splitting the cell 3d and increasing the entire surface area causes the exhaust gas to more likely to come into contact with the partition wall 4 and a partition wall 20, thus enhancing the purification effect.

In case where non-plugged cells are provided, distribution of such non-plugged cells in the cross section of the honeycomb structure is preferably uniform in order to cause exhaust gas to pass through the partition walls both at the central location and at the radially outer location. For example, by arranging more of such cells at the radially outer location than at the central location, the pressure loss at the radially outer location drops and concentration of exhaust gas flow on the center is relaxed so that the balance of exhaust gas flow across the catalytic body is improved.

To further improve the purification efficiency, the fluid like exhaust gas preferably passes through a partition wall more than once. To this end, for example as shown in FIG. 8, the cell 3e having plugging parts 10a arranged at least in two positions (two positions in this example) and the cell 3f that is adjacent to the cell 3e and have one plugging part 10b arranged between the plugging parts 10a in the longitudinal direction of the cell should be arranged alternately.

By providing such a cell arrangement pattern at least in part of the honeycomb structure 11, at least part of the fluid that has flowed from one end 2a of the honeycomb structure 11 into the cell passes through the partition wall 4 at least twice and flows out from the other end 2b. By providing such a cell arrangement pattern on the entirety of the honeycomb structure 11 causes all of the inflow fluid to pass through the partition walls at least twice, and this is more preferable.

Figure 8:
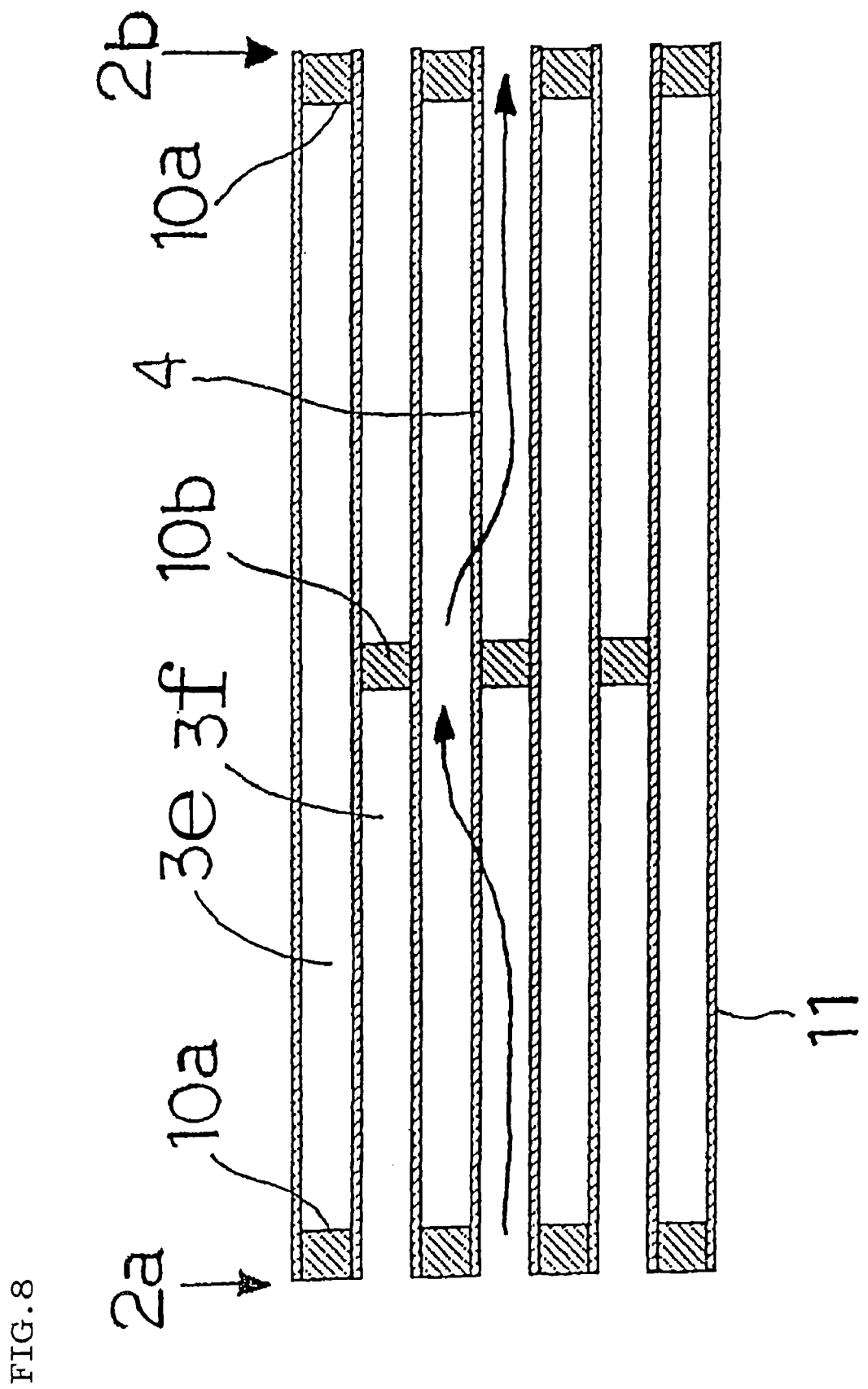
FIG. 8 is a longitudinal sectional view of a catalytic body according to a seventh embodiment of the invention.

Here, regarding the position of the plugging part in the longitudinal direction of the cell, the plugging part 10b arranged between the plugging parts 10a is preferably arranged just at the intermediate position between the plugging parts 10a, as shown in the example in FIG. 8, or at a position where the distance from the above-mentioned intermediate position is within 30% of the distance between the plugging parts 3a, because the balance of the fluid passing through the partition walls 4 is improved.

While the fluid passes through the partition wall twice in the embodiment shown in FIG. 8, it is possible to arrange such that the fluid may pass through the partition wall 4 three times or four times, by increasing the number of positions at which the plugging parts 10 are arranged. By increasing the number of partition wall passing times, it is possible to further improve the contact efficiency between exhaust gas and the catalyst while the honeycomb structure 11 is used as a catalyst carrier. Plugging parts are preferably arranged at a maximum of four positions in a single cell. Arranging more than five plugging parts on a single cell could result in an excessive pressure loss.

Figure 12:
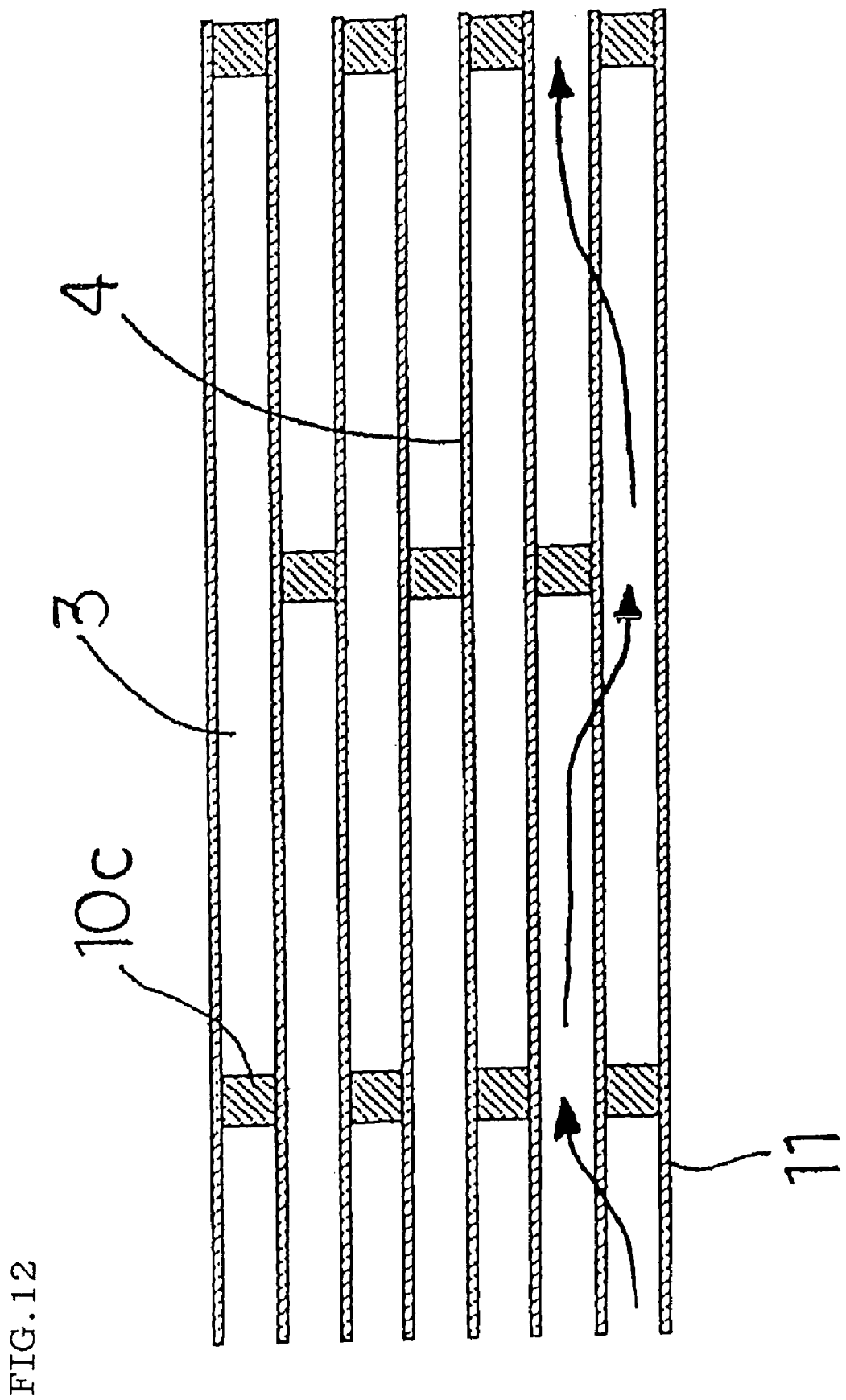
FIG. 12 is a longitudinal sectional view of a catalytic body according to a eleventh embodiment of the invention.
Figure 13:
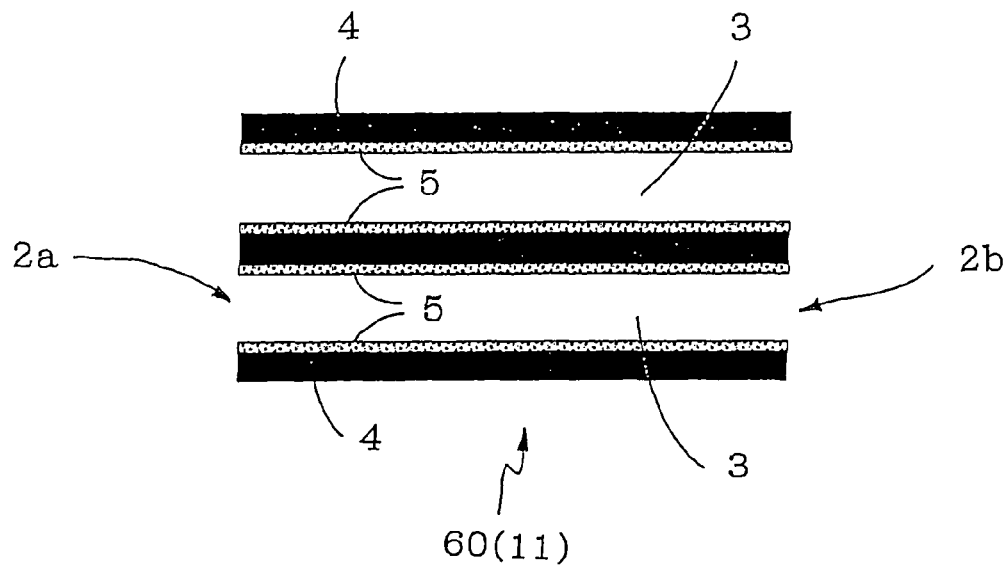
FIG. 13 is a longitudinal sectional view of a catalytic body according to the related art.
Figure 14:
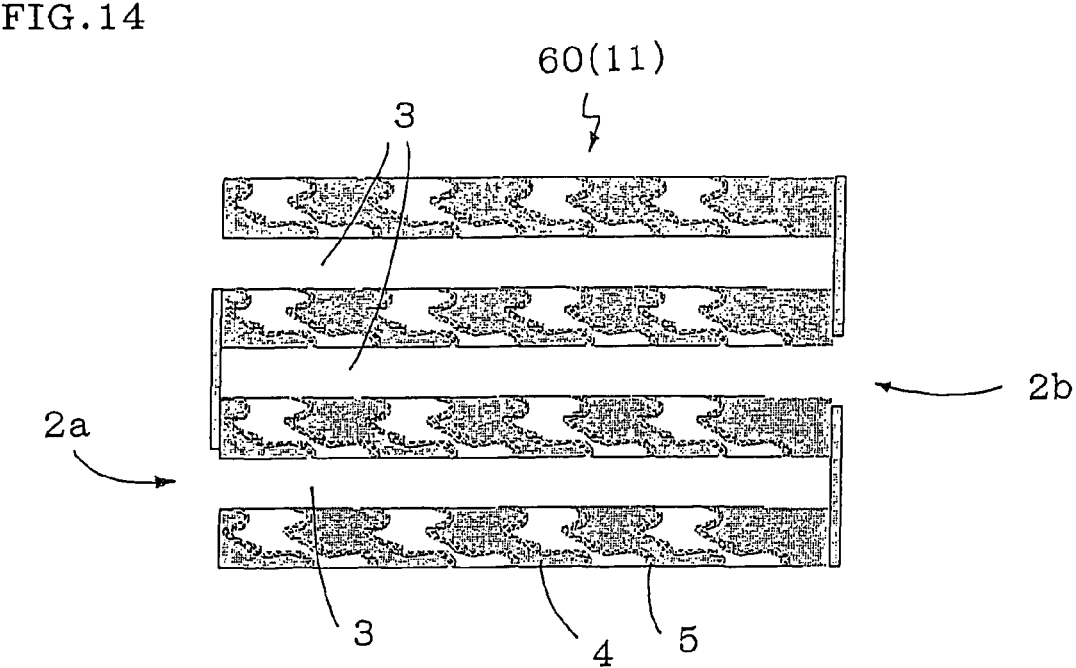
FIG. 14 is another longitudinal sectional view of a catalytic body according to the related art.

In the embodiment shown in FIG. 12, in case where the honeycomb structure 11 is used as a catalyst carrier for a honeycomb catalytic body, no plugging parts are arranged at the ends of the cells on the upstream side of exhaust gas flow (inlet side), and plugging parts 10c arranged at the most upstream position are somewhat apart from the inlet ends of the cells 3. With this arrangement, the pressure loss at the inlet is lowered and exhaust gas is more likely to flow into cells. At the same time, the thermal capacity at the inlet is reduced to enhance the ignition characteristic.

In addition to the embodiment shown in FIG. 12, such a configuration is possible that no plugging parts are arranged at the ends of the cells on the downstream side of exhaust gas flow (outlet side) and plugging parts 10d arranged at the most downstream position are somewhat apart from the outlet ends of the cells 3. With this arrangement, the pressure loss at the inlet and outlet is lowered and exhaust gas is more likely to flow in or out of the cells. At the same time, the thermal capacity at the inlet and outlet is reduced to enhance the ignition characteristic.

The honeycomb structure used in the present invention has an average pore diameter of 10 μm or more. When the average pore diameter is smaller than 10 μm, the passage resistance caused when exhaust gas passes through partition walls becomes excessively large and the pressure loss increases. When the average pore diameter is equal to or larger than 40 μm, the pressure loss is remarkably reduced and the honeycomb structure may be arranged closer to an engine in the application of engine exhaust gas purification. When the average pore diameter is equal to or larger than 50 μm, it is difficult to trap carbon particles or the like in the application of a diesel engine exhaust gas purification, thus reducing an increase in the pressure loss that accompany use of the honeycomb structure. When the average pore diameter is equal to or larger than 60 μm, a foreign matter such as ash inherent to engine oil or a fuel additive is less likely to stagnate inside fine pores. While the upper limit is not particularly specified, the value of 3000 μm or below is preferable in order to secure the inner pore surface area coming into contact with exhaust gas. Also, its porosity is set to 40% or more. Below 40%, the passage resistance of exhaust gas passing through partition walls is excessive so that the pressure loss increases. The value over 45% substantially reduces the pressure loss and the honeycomb structure may be arranged closer to an engine in the application of engine exhaust gas purification. The value over 50% improves the warming-up property due to a lightweight design and obtains good light-off performance, which is preferably used in an application where engine start/stop takes place frequently such as in an automobile exhaust gas purification application. With the value over 55%, the flow velocity of exhaust gas passing through partition walls is low enough thus further enhancing the purification effect. From the viewpoint of the strength, the value below 80% is preferred.

Note, "pore diameter" referred to herein is a physical property value measured by a mercury porosimeter. In addition, "porosity" is also a physical property value measured by a mercury porosimeter.

The density of cells (cell density) of a honeycomb structure is preferably 0.25 to 46.5 cells/cm$^2$ (1.61 to 300 cpsi), and more preferably 1.55 to 15.5 cells/cm$^2$ (10 to 100 cpsi), and most preferably 1.55 to 12.4 cells/cm$^2$ (10 to 80 cpsi) in view of the pressure loss. In case the cell density is below 0.25 cells/cm$^2$, the efficiency of contact between exhaust gas and a catalyst tends to be insufficient when the honeycomb structure is used as a catalyst carrier. In case the cell density is above 46.5 cells/cm$^2$, the pressure loss tends to increase. The "cpsi" is an abbreviation of "cells per square inch", a unit to represent the number of cells per square inch. 10 cpsi corresponds to about 1.55 cells/cm$^2$.

The thickness of partition walls is preferably 1.25 mm (50 mil) or below and more preferably 0.625 mm (25 mil) or below. In case where the thickness is 0.625 mm or below, the pressure loss is substantially reduced and the honeycomb structure can be installed in a position closer to an engine in an application of engine exhaust gas purification. Further, the thickness is preferably 0.2 mm (8 mil) or below. In case where the thickness is 0.2 mm or below, the thermal capacity of a honeycomb structure can be suppressed to a small value. It is thus possible to obtain good light-off performance (property to reach a catalytic activity temperature rapidly at a low temperature) when the honeycomb structure is used as a catalyst carrier. From the viewpoint of strength, the thickness is preferably 0.06 mm (2.5 mil) or more. A thickness of 0.1 mm (4 mil) or more is likely to obtain a sufficient pore surface area. Note that 1 mil is one thousandth inch and is about 0.025 mm.

The common logarithm standard deviation of the pore diameter distribution (pore diameter distribution σ) of partition walls is preferably 0.1 to 0.6 and more preferably 0.2 to 0.6. The pore diameter distribution σ of less than 0.1 tends to increase the partition wall passage pressure loss. In case where the pore diameter distribution σ is above 0.6, gas flows into fine pores of larger diameters so that the purification performance tends to be degraded.

The shape of a cross section along the radius direction in a plane perpendicular to the length direction of cells, a honeycomb structure is preferably a shape fit for the inner shape of an exhaust system to be installed. In particular, the shape can be a circle, an ellipse, an oval, a trapezoid, a triangle, a rectangle, a hexagon, or a laterally asymmetric irregular shape. In particular, a circle, an ellipse or an oval is preferable.

Figure 1:
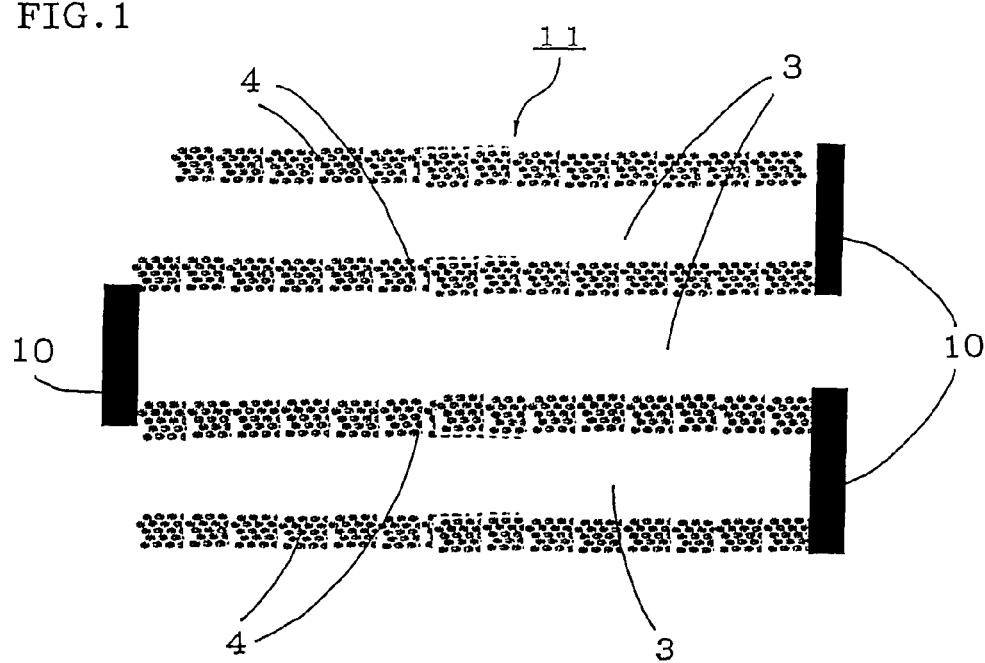
FIG. 1 is a schematic view of a catalytic body according to one embodiment of the invention.

FIG. 1 is a schematic view illustrating an exemplary embodiment of a catalytic body according to the invention. As shown in FIG. 1, a catalytic body according to the invention is composed of a honeycomb structure 11 including partition walls 4 defining a plurality of cells 3 acting as fluid passages which extend through the honeycomb structure from one end surface to the other end surface thereof and cells 3 are plugged by plugging parts 10. The honeycomb structure 11 is formed of at least one of:

(a) a catalytic substance comprising at least one type selected from a group consisting of titania, tungsten oxide, vanadium oxide, and zeolite; and (b) a substance comprising at least one type of oxide selected from a group consisting of alumina, ceria, titania, silica, and zirconia, and at least one type of noble metal carried on the at least one type of oxide and selected from a group consisting of silver, platinum, rhodium, and palladium.

That is, the present invention is characterized by using a catalyst material as at least one type of item (a) and item (b) as a base material for the honeycomb structure 11 constituting a catalytic body.

Explanation of Item (a)

With titania, the rutile type has a high heat resistance although the anatase type having a high specific area is preferably used from the viewpoint of catalytic activity. To make use of the merits of the anatase type, it is necessary to control the firing temperature of a honeycomb structure within a range where phase transition to the rutile type will not take place.

As the structure of zeolite, the X type, Y type, USY type, mordenite type, ferrierite type, ZSM-5 type, β type or the like is arbitrarily used. One of these types or a combination of plural types may be used. For example, a mixture of the USY type and ZSM-5 type with different pore diameters may be used. Or, the β type with two pore diameters may be used independently.

The silica/alumina ratio of zeolite is 3 or more or preferably 10 or more. A silica/alumina ratio of 25 or above may be preferably used in an application that requires high heat resistance such as purification of automobile exhaust gas. A ratio of 50 or above allows the honeycomb structure to be preferably installed in a position closer to an engine (a position whose exhaust gas temperature is high). While the upper limit is not specified, a ratio of 300 or below is desirable to secure an ion exchange site in case ion exchange described later is made.

With zeolite, zeolite that does not carry a metal, noble metal carrying zeolite, or base metal carrying zeolite is arbitrarily used. A method for causing zeolite to carry a metal may be simple doping or ion exchange. Noble metal carrying zeolite, or transition metal carrying zeolite is preferable. Noble metal ion exchange zeolite or transition metal ion exchange zeolite is more preferable from the viewpoint of thermal stability. Noble metal carrying zeolite and base metal carrying zeolite may be used in mixture or a noble metal and a base metal may be carried on zeolite at the same time. More than one type of noble metal or base metal may be used.

With an ion exchange metal, a platinum-group metal (Pt, Pd, Rh), silver, a base metal, and in particular a transition metal is preferably used.

(a) A honeycomb structure (partition wall) may be composed of a catalytic substance as at least one type selected from a group consisting of titania, tungsten oxide, vanadium oxide, and metal-carrying zeolite.

Explanation of Item (b)

The catalytic active component of noble metals such as Platinum (Pt), rhodium (Rh), and palladium (Pd) preferably forms a honeycomb structure while dispersedly carried by oxide particles from the viewpoint of dispersibility or heat resistance. When the honeycomb structure is carried using a method for impregnating an honeycomb structure with a catalyst solution containing a catalytic active component after it has been formed with an oxide, there is an advantage that concentrated arrangement of the catalytic active component on the partition wall pore surface enhances the efficiency of contact between exhaust gas and a catalytic active component. The oxide is preferably alumina ($Al_2O_3$) although ceria ($CeO_2$), titania ($TiO_2$), silica ($SiO_2$), or zirconia ($ZrO_2$) may be used. Such an oxide may be used independently or in combination of two or more types. The combination may be through mixture or formation of a composite oxide. For example, a composite oxide of ceria and zirconia or the like is preferably used. A rare earth element such as La may be added to these oxides to improve heat resistance. Two or more types of catalytic active component may be used together. In such a case, two or more types may be carried on an oxide at the same time although two or more types of oxide obtained by carrying different components are preferably used in mixture from the viewpoint of suppression of alloying.

As $Al_2O_3$, $\gamma Al_2O_3$, $\theta Al_2O_3$, $\delta Al_2O_3$, $\alpha Al_2O_3$ or the like may be arbitrarily used. A heat-resistant alumina such as $\delta Al_2O_3$ or $\theta Al_2O_3$ is appropriate in use under high temperature. In case the temperature load is relatively small, $\gamma Al_2O_3$ $\theta Al_2O_3$ or the like whose specific surface area is large enough to dispersedly carry a catalytic active component is appropriate. $Al_2O_3$ gels (such as xerogel, aerogel and cryogel) prepared by way of the sol-gel method are preferably used. In this case, a catalytic active component such as a noble metal may be contained in a gel after preparation of an $Al_2O_3$ gel. Or, after an $Al_2O_3$ gel is prepared, the gel may carry a catalyst. In case a process exists where an $Al_2O_3$ gel comes into contact with a liquid such as water while a catalytic body is being prepared, a cryogel with high water resistance is preferably used.

Explanation Common to Items (a) and (b)

The specific surface area of a catalyst material other than a catalytic active component is preferably 10 to 1000 $m^2/g$. A specific surface area of below 10 $m^2/g$ fails to carry a catalytic active component in a highly dispersed state. When 1000 $m^2/g$ is exceeded, the heat resistance is insufficient. To be more precise, with alumina or titania, a range of 10 to 300 $m^2/g$ is preferable. With silica, ceria or zirconia, a range of 10 to 200 $m^2/g$ is preferable. With zeolite, a range of 30 to 1000 $m^2/g$ is preferable. After these oxides are molded and fired into a honeycomb structure, the range is preferably maintained.

In case a noble metal is used as a catalytic active component, its content is preferably 0.17 to 7.07 g/L (honeycomb volume). A content value of less than 0.17 g/L leads to insufficient catalytic activity. When 7.97 g/L is exceeded, it is difficult to secure high dispersion characteristic and the cost incurred is high.

Preferable examples of items (a) and (b) include platinum group and/or Ag carrying alumina or zeolite, Cu and/or Fe carrying zeolite, and V-W carrying titania.

Partition walls (catalyst partition walls) composed of a catalyst material may be formed of a plurality of layers. In such a case, the type of an oxide contained and/or type of a catalytic active component may be different between layers. For example, $CeO_2$ having an oxygen storing/releasing capability contributes to enhancement of ternary performance in steady operation and is thus preferably used as an oxide constituting a catalyst surface layer (layer exposed to a cell). Rh accelerates an NOx decomposition reaction and NOx reduction reaction and is thus a noble metal useful for enhancement of NOx purifying capability. However, Rh tends to react with $CeO_2$ to form a solid solution thus causing deactivation. Thus, $CeO_2$ and Rh preferably exist separately on different layers. Pd enhances the light-off performance of a catalyst. In one preferable embodiment, Pd is carried on a surface layer that is likely to come into contact with exhaust gas and another noble metal is carried on another layer.

To obtain a catalytic body having an NOx selective reduction performance, partition walls are preferably composed of a catalytic substance as at least one type selected from a group consisting of titania, tungsten oxide, vanadium oxide, and transition metal-substituted zeolite listed in the item (a) above.

In case where catalyst partition walls are to be composed of plural layers, the average pore diameter may differ between layers. For example, by adjusting the average pore diameter on each layer so that the average pore diameter will becomes larger from a surface layer to a base layer (layer not exposed to an exhaust gas passage), it is possible to provide a more uniform flow of exhaust gas passing through partition walls and make effective use of catalyst partition walls.

In order to suppress the thermal stress in use below a material destruction limit and suppress the destruction probability in use below a tolerance limit, the cell structure, that is, the partition wall thickness and cell density preferably satisfy the relation expressed by the expression (1) with respect to a material characteristic.

[Expression 1]

$$\sigma/E \geq 0.0161 \cdot \alpha \cdot (GSA)/\{H \cdot (\rho \cdot C \cdot \lambda)^{0.5}\} \quad (1)$$

In Expression (1), σ [MPa] is the material strength (single sheet bending of partition wall; in particular, a material strength measured through four-point bending in accordance with a method conforming to JIS R1601 or a material strength obtained by converting a test result using another method to this method by way of an effective volume), E [MPa] is the Young's modulus (single sheet bending of a partition wall) of material, $\alpha[10^{-6}/K]$ is the coefficient of thermal expansion of the honeycomb in a direction perpendicular to a cell axis direction; where $\alpha \geq 1$, GSA $[m^2/m^3]$ denotes the geometrical surface area per volume of the honeycomb, H [m] denotes a hydraulic diameter of the honeycomb cell, $\rho$ [kg/m³] denotes the bulk density of the honeycomb structure, C [J/kgK] denotes the specific heat of the material, λ [W/mK] denotes the thermal conductivity of the honeycomb cell=λm·b/p (where λm is the thermal conductivity [W/mK] of the material, b is a partition wall thickness [m] and p is a cell pitch (spacing between the partition walls) [m]), respectively.

The permeability of the partition walls 4 of a honeycomb structure 11 is preferably $7 \times 10^{-12}$ to $4 \times 10^{-8}$ m², and more preferably $1 \times 10^{-11}$ to $8 \times 10^{-10}$ m², and most preferably $3 \times 10^{-11}$ to $3 \times 10^{-10}$ m². Given the permeability of the partition wall 4 within the numeric value range, carbon particles contained in exhaust gas emitted from a diesel engine is hard to be trapped by the partition walls 4 and most of them pass through the partition walls 4. Using such a honeycomb structure 11 provides a catalytic body whose pressure loss is small and is unlikely to increase the pressure loss even after use for a substantial period.

The "permeability" denotes the physical characteristic value calculated using the expression (2). This value serves as an index representing a passage resistance of predetermined gas in passing through the object (partition wall). In the following expression (2), C denotes a permeability (m²), F a gas flow rate (cm³/s), T a sample thickness (cm), V a gas viscosity (dynes.sec/cm²), D a sample diameter (cm), and P a gas pressure (PSI), respectively. The numeric values in the expression (1) is 13.839 (PSI)=1 (atm) and 68947.6 (dynes.sec/cm²)=1 (PSI).

[Expression 2]

$$C = (8FTV/\pi D^2(P^2 - 13.839^2)/13.839 \times 68947.6) \times 10^{-4} \quad (2)$$

FIG. 15 is a schematic view illustrating a test specimen used for measurement of permeability. As shown in FIG. 15, a test specimen 100 is cut from a honeycomb structure or a honeycomb catalytic body in such a shape that the test specimen 100 comprises one partition wall and parts of partition walls (remaining ribs 105) connected to the one partition wall 4 with the rib height H of 0.2 mm. The shape of the test specimen 100 may be a square or a disc. Room air is caused to pass through the test specimen 100 and the permeability is calculated using the expression (2). To avoid air leakage from a gap between the test specimen 100 and a seal formed by the remaining ribs 105, a flowable seal such as grease is preferably used in combination. The air flow rate is adjusted so that the partition wall passage velocity obtained through calculation will reach 0.1 to 1 cm/sec and the result measured using the air flow rate is used.

The method according to the invention is a method for manufacturing a catalytic body comprising a porous honeycomb structure including partition walls defining a plurality of cells acting as fluid passages which extend through the honeycomb structure from one end surface to the other end surface thereof, the honeycomb structure being formed of at least one type of the above-mentioned items (a) and (b); wherein the method comprises the steps of performing extrusion molding a catalyst material in the form of a plastical body including at least one type of organic and inorganic pore forming agents mixed therein by using a ferrule to obtain a honeycomb-shaped catalyst material; and raising a temperature of the honeycomb-shaped catalyst material to a predetermined temperature during or after a drying process of the honeycomb-shaped catalyst material to remove the pore forming agent by oxidation or densify the pore forming agent to thus form pores in the catalyst partition walls.

By mixing an organic pore forming agent in a catalyst material in the form of a plastical body used to form a catalyst and removing the pore forming agent by oxidation to form fine pores in the catalyst partition walls, it is possible to readily form a porous catalyst partition wall layer with permeability. As an organic pore forming agent, for example, starch, a foamed resin, or an absorbent polymer is preferably used. In case the firing temperature is high, inorganic pore forming agents such as carbon, graphite and silica gel may be preferably used. An organic pore forming agent is preferred because it does not influence the composition of a honeycomb structure due to burn-off in the firing process.

Here, the porosity of catalyst partition walls formed by this method may be adjusted by the amount of a pore forming agent to be mixed or the like. The average pore diameter of the catalyst partition walls may be adjusted by the particle diameter of a pore forming agent and the average particle diameter of an oxide that occupies the most part of a catalyst material. For example, if wishing to set the average pore diameter of the catalyst partition walls to 40 μm, particles of an oxide whose average particle diameter is 40 μm, the same as that of the catalyst partition walls, should be used. To form a catalyst material in the shape of a plastical body into a honeycomb shape, a known method such as extrusion molding and a known molding auxiliary agent or the like are applicable.

Plugging may be made after the partition walls are formed and fired together with the partition walls or may be made after formation and firing of partition walls followed by drying and/or re-firing.

The present invention will be further detailed based on examples. Note that the invention is not limited to these examples.

EXAMPLE 1

A honeycomb structure with a diameter of 105.7 mm, a length of 114.2 mm, a volume of 1 liter, a partition wall thickness of 8 mil (0.203 mm), a cell density of 300 cpsi (46.5 cells/cm²), an average pore diameter of 40 μm, and a porosity of 60% was formed with an alumina catalyst material carrying a noble metal and plugging was applied in a pattern shown in FIG. 2. The method for manufacturing the honeycomb structure will be detailed. Mixture particles (specific surface area: 50 m²/g) of $\gamma Al_2O_3$ with an initial average particle diameter of 150 μm and $CeO_2$ were subjected to wet disintegration with a ball mill to obtain disintegrated particles with an average particle diameter of 20 μm. The disintegrated particles were immersed in a solution containing Pt and Rh to cause Pt and Rh to be carried inside the fine pores in the disintegrated particles. A foamed resin as a pore forming agent was added to the disintegrated particles carrying Pt and Rh, and acetic acid, water and an organic binder were further added, mixed together and kneaded to obtain a plastical body. The plastical body was subjected to extrusion molding from a ferrule to form a honeycomb-shaped catalyst material. After drying, the material was fired at 600° C. for three hours to complete the honeycomb-shaped catalyst material. For the amount of a noble metal, the amount of Pt was 2 g per honeycomb structure volume of one liter and the amount of Rh was 0.5 g per honeycomb structure volume of one liter. The average pore diameter of the catalyst partition wall was 40 μm.

The catalytic body was attached to an exhaust system of an automobile where a gasoline engine with a displacement of two liters. The automobile was driven on a chassis dynamo in the US emission regulation driving mode and the emissions of CO, HC and NOx were measured. Also, the pressure loss incurred at full load was measured. The measurement results are shown in Table 1 in as relative values.

EXAMPLE 2 TO 6

Same as the above example, catalytic bodies plugged in the patterns shown in FIGS. 3 to 7A were manufactured and the same test was conducted. The results are shown in Table 1. The cell density, partition wall thickness, and Pt and Rh amounts are same as those in Example 1.

EXAMPLES 7 TO 11

Same as the above example, catalytic bodies plugged in the patterns shown in FIGS. 8 to 12 were manufactured and the same test was conducted. The results are shown in Table 1. The cell density, partition wall thickness, and Pt and Rh amounts are same as those in Example 1.

EXAMPLE 12

A honeycomb structure with a diameter of 105.7 mm, a length of 114.2 mm, a volume of 1 liter, a partition wall thickness of 8 mil (0.203 mm), a cell density of 300 cpsi (46.5 cells/cm$^2$), an average pore diameter of 40 μm, and a porosity of 60% was formed with an alumina catalyst material and plugging was applied in a pattern shown in FIG. 2A. The method for manufacturing the honeycomb structure will be detailed. Mixture particles (specific surface area: 50 m$^2$/g) of γAl$_2$O$_3$ with an initial average particle diameter of 150 μm and CeO$_2$ were subjected to wet disintegration with a ball mill to obtain disintegrated particles with an average particle diameter of 20 μm. A foamed resin as a pore forming agent was added to the disintegrated particles, and acetic acid, water and an organic binder were further added, mixed together and kneaded to obtain a plastical body. The plastical body was subjected to extrusion molding from a ferrule to form a honeycomb-shaped catalyst material. After drying, the material was fired at 600° C. for three hours to form the honeycomb-shaped catalyst material. The obtained honeycomb structure was immersed in a solution containing Pt and Rh and heat-treated at 600° C. for three hours to cause Pt and Rh to be carried to complete the honeycomb-shaped catalytic body. For the amount of a noble metal, the amount of Pt was 2 g per honeycomb structure volume of one liter and the amount of Rh was 0.5 g per honeycomb structure volume of one liter. The average pore diameter of the catalyst partition wall was 40 μm.

EXAMPLE 13

A honeycomb-shaped catalytic body was obtained using the same method as Example 1 except that plugging was not applied.

EXAMPLE 14

A honeycomb-shaped catalytic body with an average pore diameter of 24 μm and a porosity of 52% was obtained using the same method as Example 1 except that the amount of addition of a pore forming diameter was reduced to 60%.

EXAMPLE 15

A honeycomb-shaped catalytic body with an average pore diameter of 20 μm and a porosity of 45% was obtained using the same method as Example 1 except that the amount of addition of a pore forming diameter was reduced to 30%.

EXAMPLE 16

A honeycomb-shaped catalytic body with an average pore diameter of 15 μm and a porosity of 38% was obtained using the same method as Example 1 except that a pore forming agent was not used.

EXAMPLE 17

A honeycomb-shaped catalytic body with an average pore diameter of 9 μm and a porosity of 37% was obtained using the same method as Example 1 except that the mixture particles of γAl$_2$O$_3$ and CeO$_2$ were subjected to wet disintegration until an average particle diameter of 10 μm was obtained and that a pore forming agent was not used. With any of Examples 13 through 17, the cell density, partition wall thickness, and Pt and Rh amounts are same as those in Examples.

COMPARATIVE EXAMPLE 1

Plugging was applied in a pattern shown in FIG. 2A to a cordierite honeycomb structure with a diameter of 105.7 mm, a length of 114.2 mm, a volume of 1 liter, a partition wall thickness of 8 mil (0.203 mm), a cell density of 300 cpsi (46.5 cells/cm$^2$). Mixture particles (specific surface area: 50 m$^2$/g) of γAl$_2$O$_3$ with an initial average particle diameter of 45 μm and CeO$_2$ were subjected to wet disintegration with a ball mill to obtain disintegrated particles with an average particle diameter of 5 μm. The disintegrated particles were immersed in a solution containing Pt and Rh to cause Pt and Rh to be carried inside the fine pores in the disintegrated particles. Acetic acid, water and an organic binder were further added to the disintegrated particles carrying Pt and Rh to obtain a slurry for coating. The slurry for coating was subjected to vacuum suction from the end surface at the outlet of the honeycomb structure to coat the slurry on the inner surface of partition wall fine pores. After drying, firing was performed at 600° C. for three hours to form a catalyst coating layer and the catalytic body was completed. The amount of coated oxide (γAl$_2$O$_3$ or CeO$_2$) was 150 g per honeycomb structure volume of one liter. With the amount of a noble metal, the amount of Pt was 2 g per honeycomb structure volume of one liter and the amount of Rh was 0.5 g per honeycomb structure volume of one liter. The catalytic body after coating had an average pore diameter 8 μm and a porosity of 35%.

COMPARATIVE EXAMPLE 2

Figure 9:
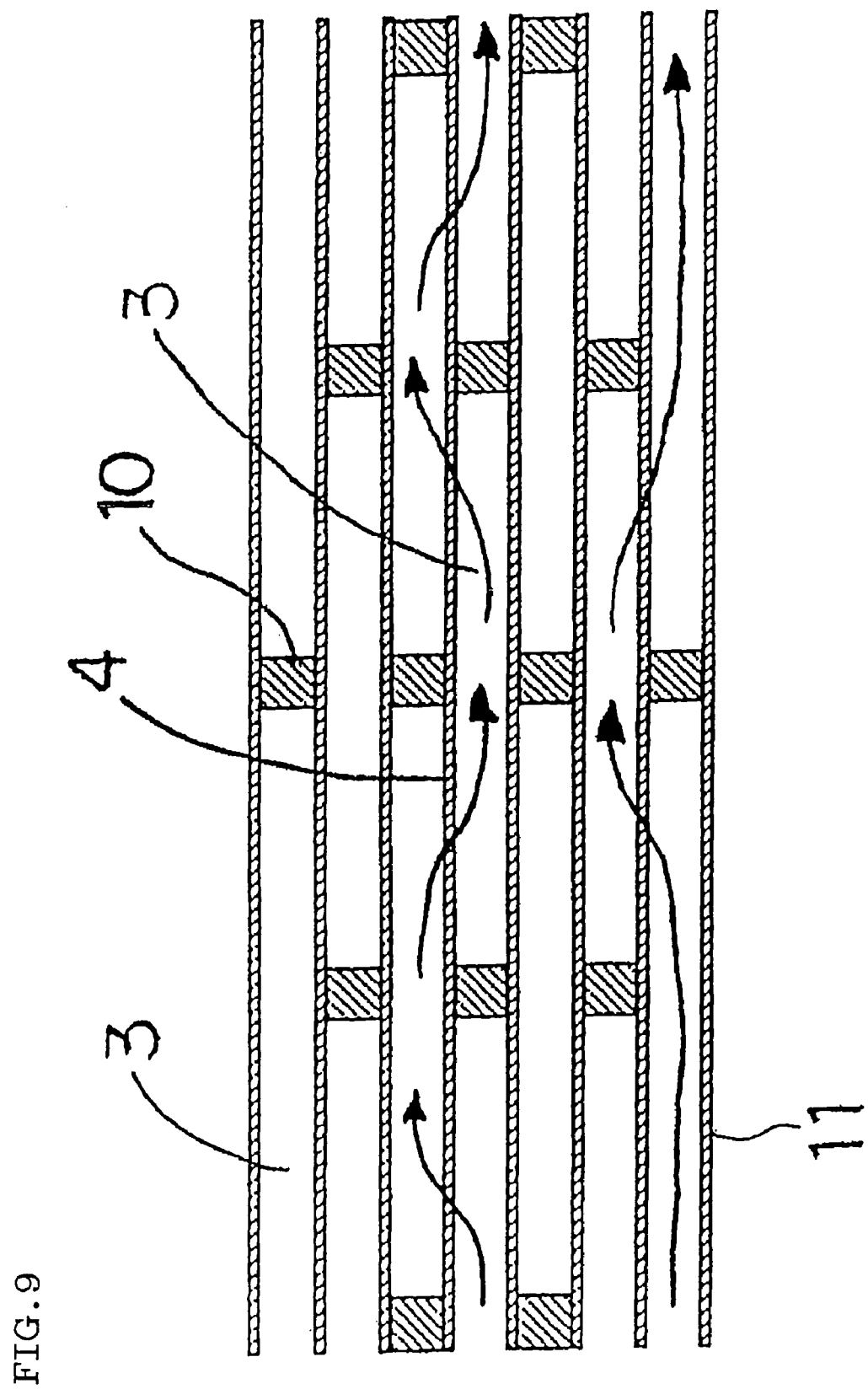
FIG. 9 is a longitudinal sectional view of a catalytic body according to an eighth embodiment of the invention.

Same as Comparative Example 1, a catalytic body plugged in the pattern shown in FIG. 9 was manufactured and the same test was conducted. The cell density, partition wall thickness, and Pt and Rh amounts are same as those in Example 1.

TABLE 1

Figure 10:
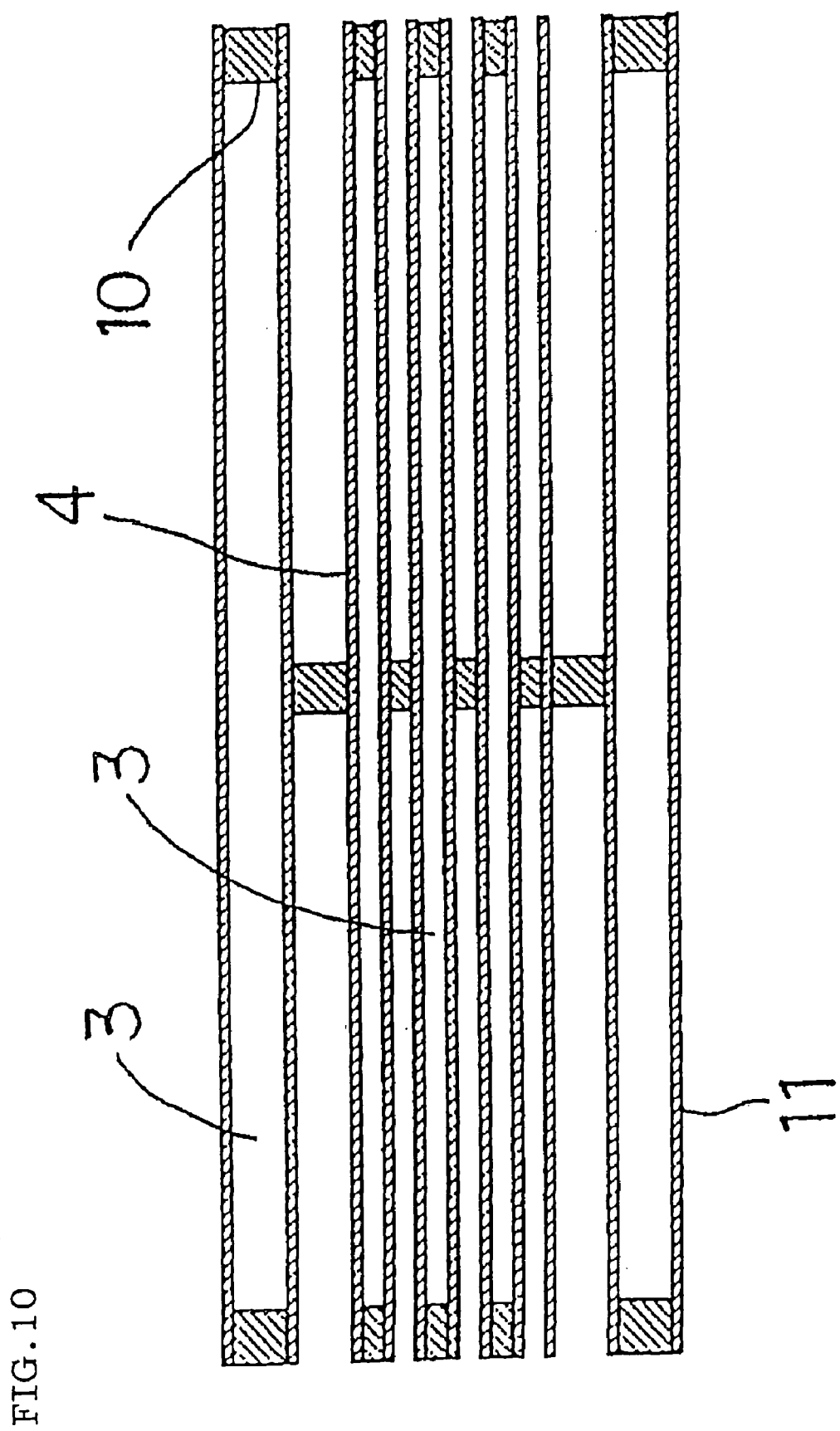
FIG. 10 is a longitudinal sectional view of a catalytic body according to a ninth embodiment of the invention.
Figure 11:
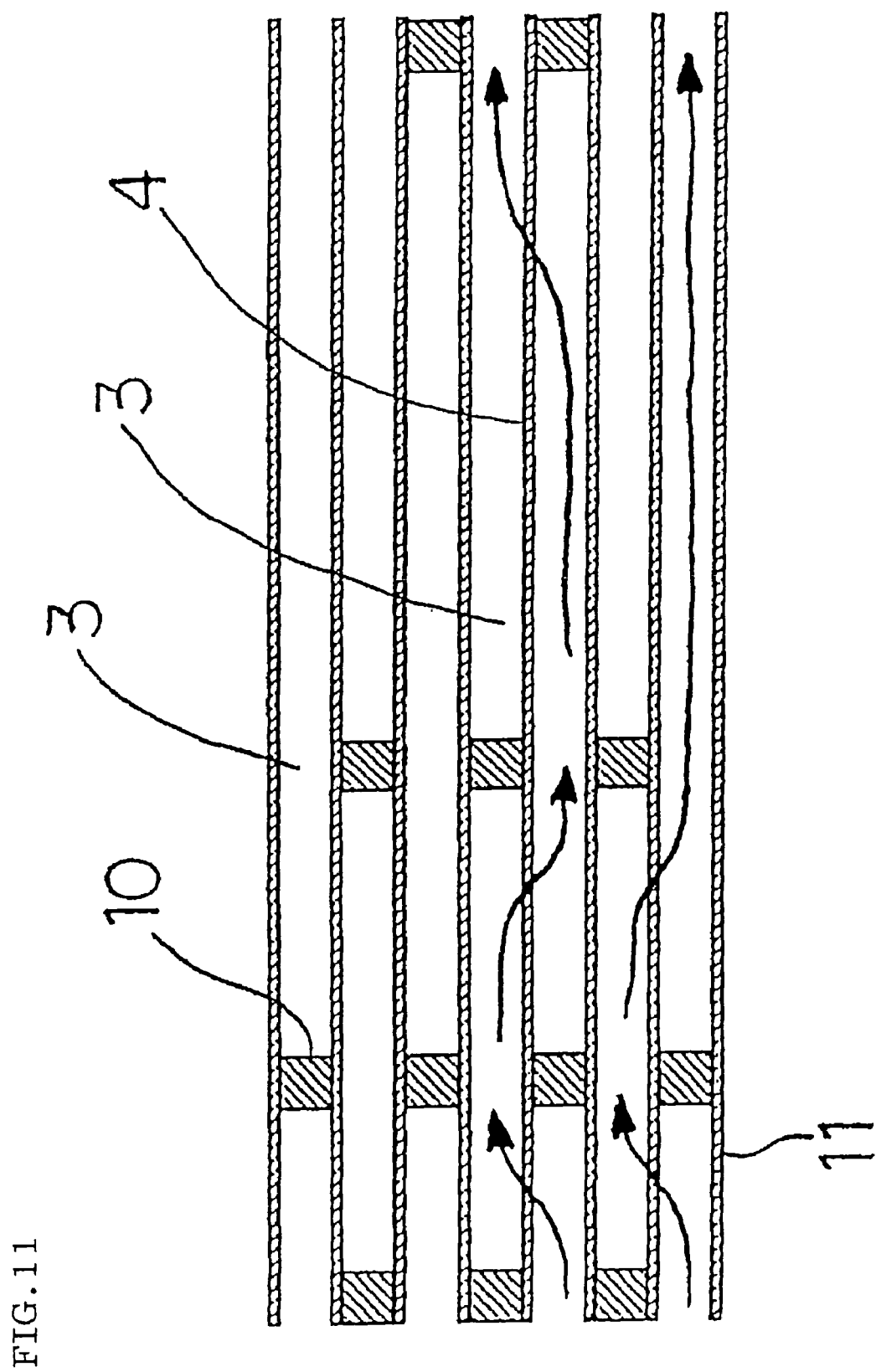
FIG. 11 is a longitudinal sectional view of a catalytic body according to a tenth embodiment of the invention.

| | Catalyst | Emission relative value CO | HC | NOX | Pressure loss relative value | Permeability |
|---|---|---|---|---|---|---|
| Example 1 (structure shown in FIG. 2) | Formation of partition walls | 0.7 | 0.6 | 0.5 | 0.9 | $3.7 \times 10^{-11}$ |
| Example 2 (structure shown in FIG. 3) | Same as above | 0.7 | 0.8 | 0.4 | 0.5 | |
| Example 3 (structure shown in FIG. 4) | Same as above | 0.8 | 0.6 | 0.4 | 0.4 | |
| Example 4 (structure shown in FIG. 5) | Same as above | 0.7 | 0.6 | 0.4 | 0.5 | |
| Example 5 (structure shown in FIG. 6) | Same as above | 0.6 | 0.6 | 0.4 | 0.6 | |
| Example 6 (structure shown in FIG. 7) | Same as above | 0.6 | 0.5 | 0.3 | 0.8 | |
| Example 7 (structure shown in FIG. 8) | Same as above | 0.4 | 0.3 | 0.2 | 1.1 | |
| Example 8 structure shown in FIG. 9) | Same as above | 0.3 | 0.2 | 0.1 | 1.4 | |
| Example 9 structure shown in FIG. 10) | Same as above | 0.2 | 0.3 | 0.2 | 1.3 | |
| Example 10 structure shown in FIG. 11) | Same as above | 0.3 | 0.3 | 0.2 | 1 | |
| Example 11 structure shown in FIG. 12) | Same as above | 0.2 | 0.3 | 0.2 | 0.9 | |
| Example 12 | Same as above | 0.6 | 0.7 | 0.5 | 0.9 | $4.0 \times 10^{-11}$ |
| Example 13 | Same as above | 1.6 | 1.6 | 1.5 | 0.2 | |
| Example 14 | Same as above | 0.7 | 0.7 | 0.5 | 1.4 | $2.7 \times 10^{-11}$ |
| Example 15 | Same as above | 0.8 | 0.7 | 0.6 | 1.2 | $1.6 \times 10^{-11}$ |
| Example 16 | Same as above | 0.8 | 0.7 | 0.7 | 1.6 | $9.8 \times 10^{-12}$ |
| Example 17 | Same as above | 0.8 | 0.8 | 0.6 | 1.8 | $7.1 \times 10^{-12}$ |
| Comparative Example 1 | Coating inside partition wall fine pores | 1 | 1 | 1 | 2 | $2.7 \times 10^{-12}$ |
| Comparative Example 2 structure shown in FIG. 8) | Coating inside partition wall fine pores | 0.9 | 1.1 | 1.2 | 3.0 (Unavailable) | |

EXAMPLE 18

A honeycomb structure with an outer shape port of 80 mm×500 mmL, a partition wall thickness of 25 mil, a cell density of 30 cpsi, an average pore diameter of 30 μm, and a porosity of 55% was formed with a $V_2O_5$—$WO_3$—$TiO_2$-based catalyst material and plugging was applied in a pattern shown in FIG. 2A. The method for manufacturing the honeycomb structure will be detailed. One kilogram of metavanadate ammonium and two kilograms of paratungstate ammonium were added to 20 kilograms of $TiO_2$ powder(specific surface area: 50 $m^2/g$) and a foamed resin as a pore forming agent was further added and mixed with an organic binder and water and kneaded to obtain a plastical body. Through extrusion molding of the plastical body from a ferrule, a honeycomb-shaped catalyst material was formed. After drying, the material was fired at 500° C. for five hours to obtain a honeycomb-shaped catalytic body.

COMPARATIVE EXAMPLE 3

A honeycomb-shaped catalytic body with an average pore diameter of 1 μm and a porosity of 23% was obtained using the same method as Example 18 except that a pore forming agent was not added and that plugging was not applied.

The honeycomb-shaped catalytic body of Example 18 and Comparative Example 3 was attached to a reactor of a catalyst performance evaluation device and the denitration activity was measured under the following evaluation conditions. The denitration ratio is represented by the following expression.

Gas composition: NO: 200 ppm; $NH_3$: 200 ppm; $O_2$: 10%; $H_2O$: 10%; $SO_2$: 50 ppm; $N_2$: balance
Gas flow rate: 10000 L/hr
gas temperature: 250° C., 400° C.

Denitration ratio (%): ((Inlet NOx concentration−outlet NOx concentration)×100

The obtained measurement results are shown in Table 2.

TABLE 2

| | Denitration ratio (%) | | Pressure loss |
|---|---|---|---|
| | 250° C. | 400° C. | relative value |
| Example 18 | 58 | 89 | 0.8 |
| Comparative Example 3 | 36 | 72 | 0.2 |

EXAMPLE 19

A honeycomb structure with an outer shape port of 80 mm×500 mmL, a partition wall thickness of 25 mil, a cell density of 30 cpsi, an average pore diameter of 25 μm, and a porosity of 51% was formed with a zeolite-based catalyst material and plugging was applied in a pattern shown in FIG. 2A. The method for manufacturing the honeycomb structure will be detailed. A foamed resin as a pore forming agent was added to 10 kilograms of Cu-carrying ZSM-5 ($SiO_2$/$Al_2O_3$ ratio: 50; Cu content: 1.5%; specific surface area: 150 $m^2/g$) and ten kilograms of Ag-carrying β zeolite ($SiO_2$/$Al_2O_3$ ratio: 50; Ag content: 1.5%; specific surface area: 150 $m^2/g$) and mixed with an organic binder and water and kneaded to obtain a plastical body. Through extrusion molding of the plastical body from a ferrule, a honeycomb-shaped catalyst material was formed. After drying, the material was fired at 500° C. for five hours to obtain a honeycomb-shaped catalytic body.

COMPARATIVE EXAMPLE 4

A honeycomb-shaped catalytic body with an average pore diameter of 7 μm and a porosity of 30% was obtained using the same method as Example 19 except that a pore forming agent was not added and that plugging was not applied.

COMPARATIVE EXAMPLE 5

Plugging was applied in a pattern shown in FIG. 2 to a cordierite honeycomb structure with an outer shape port of 80 mm×500 mmL, a partition wall thickness of 25 mil, a cell density of 30 cpsi, an average pore diameter of 40 μm, and a porosity of 60%. A mixture of the equal amount of Cu-carrying ZSM-5 and Ag-carrying β zeolite was subjected to wet disintegration with a ball mill to obtain disintegrated particles with an average particle diameter of 5 μm. Acetic acid, water and an organic binder were added to the disintegrated particles to obtain a slurry for coating. The slurry for coating was subjected to vacuum suction from the end surface at the outlet of the honeycomb structure to coat the slurry on the inner surface of partition wall fine pores. After drying, firing was performed at 600° C. for three hours to form a catalyst coating layer and the catalytic body was completed. The amount of coated zeolite was 200 g per honeycomb structure volume of one liter. With the amount of a transition metal, the amount of Cu or Ag was the same as that in Example 14. The catalytic body after coating had an average pore diameter 6 μm and a porosity of 26%.

The honeycomb-shaped catalytic body of Example 19 and Comparative Examples 4 and 5 was attached to a reactor of a catalyst performance evaluation device and the denitration activity was measured under the following evaluation conditions. The denitration ratio is represented by the following expression.

Gas composition: NO: 200 ppm; NH$_3$: 200 ppm; O$_2$: 10%; N$_2$: balance
Gas flow rate: 10000 L/hr
gas temperature: 250° C., 400° C.

Denitration ratio (%)=((Inlet NOx concentration−outlet NOx)/Inlet NOx concentration)×100

The obtained measurement results are shown in Table 3.

TABLE 3

| | Denitration ratio (%) | | Pressure loss |
|---|---|---|---|
| | 250° C. | 400° C. | relative value |
| Example 19 | 62 | 91 | 0.7 |
| Comparative Example 4 | 34 | 73 | 0.2 |
| Comparative Example 5 | 55 | 86 | 1.7 |

The invention may be preferably used as a catalytic body for purification of components to be purified such as CO, HC and NOx contained in exhaust gas emitted from stationary engines for automobiles, construction machines and industries as well as combustion devices and its manufacturing method.

What is claimed is:
1. A catalytic body comprising:
a porous honeycomb structure including partition walls defining a plurality of cells acting as fluid passages which extend through the honeycomb structure from one end surface to the other end surface thereof, the plurality of cells comprises cells at first positions and cells at second positions, the first positions and the second positions are arranged alternately,
the honeycomb structure being formed of at least one of:
(a) a catalytic substance comprising at least one of titania, tungsten oxide, vanadium oxide, and zeolite; and
(b) a substance comprising at least one oxide selected from the group consisting of alumina, ceria, titania, silica, and zirconia, and at least one noble metal carried on the at least one oxide and selected from the group consisting of silver, platinum, rhodium, and palladium;
wherein 10% or more of said plurality of cells are plugged by plugging parts formed at least either at one end or a middle portion of the fluid passages,
pore diameter distribution of the partition walls is 0.2 to 0.6,
an average pore diameter of said honeycomb structure is 40 μm or more,
cells at the first positions include plugging ports at both ends of the fluid passages thereof, and
cells at the second positions include plugging ports in the middle portion of the fluid passages thereof.
2. The catalytic body according to claim 1, wherein 50% or more of said plurality of cells are plugged by plugging parts formed at least either at one end or in the middle portion of the passages.
3. A catalytic body comprising a porous honeycomb structure including partition walls defining a plurality of cells acting as fluid passages which extend through the honeycomb structure from one end surface to the other end surface thereof, the plurality of cells comprises cells at first positions and cells at second positions, the first positions and the second positions are arranged alternately,
the honeycomb structure being formed of at least one of:
(a) a catalytic substance comprising at least one of titania, tungsten oxide, vanadium oxide, and zeolite; and
(b) a substance comprising at least one oxide selected from the group consisting of alumina, ceria, titania, silica, and zirconia, and at least one noble metal carried on the at least one oxide and selected from the group consisting of silver, platinum, rhodium, and palladium;
wherein an average pore diameter of said honeycomb structure is 40 μm or more,
pore diameter distribution of the partition walls is 0.2 to 0.6,
cells at the first positions include plugging ports at both ends of the fluid passages thereof, and
cells at the second positions include plugging ports in a middle portion of the fluid passages thereof.
4. A catalytic body comprising a porous honeycomb structure including partition walls defining a plurality of cells acting as fluid passages which extend through the honeycomb structure from one end surface to the other end surface thereof, the plurality of cells comprises cells at first positions and cells at second positions, the first positions and the second positions are arranged alternately,
the honeycomb structure being formed of at least one of:
(a) a catalytic substance comprising at least one of titania, tungsten oxide, vanadium oxide, and zeolite; and
(b) a substance comprising at least one oxide selected from the group consisting of alumina, ceria, titania, silica, and zirconia, and at least one noble metal carried on the at least one oxide and selected from the group consisting of silver, platinum, rhodium, and palladium;
wherein a porosity is 40% or more,
pore diameter distribution of the partition walls is 0.2 to 0.6,
an average pore diameter of said honeycomb structure is 40 μm or more,
cells at the first positions include plugging ports at both ends of the fluid passages thereof, and
cells at the second positions include plugging ports in a middle portion of the fluid passages thereof.
5. The catalytic body according to claim 4, wherein the porosity is 50% or more.
6. The catalytic body according to claim 1, wherein said zeolite is at least one of a noble metal carrying zeolite and a transition metal carrying zeolite.

7. The catalytic body according to claim 3, wherein said zeolite is at least one of a noble metal carrying zeolite and a transition metal carrying zeolite.

8. The catalytic body according to claim 4, wherein said zeolite is at least one of a noble metal carrying zeolite and a transition metal carrying zeolite.

9. The catalytic body according to claim 6, wherein said zeolite is at least one of a noble metal ion-exchange zeolite and a transition metal ion-exchange zeolite.

10. The catalytic body according to claim 7, wherein said zeolite is at least one of a noble metal ion-exchange zeolite and a transition metal ion-exchange zeolite.

11. The catalytic body according to claim 8, wherein said zeolite is at least one of a noble metal ion-exchange zeolite and a transition metal ion-exchange zeolite.

12. The catalytic body according to claim 1, wherein a thickness of said partition wall is 60 μm or more.

13. The catalytic body according to claim 3, wherein a thickness of said partition wall is 60 μm or more.

14. The catalytic body according to claim 4, wherein a thickness of said partition wall is 60 μm or more.

15. A method for manufacturing a catalytic body comprising a porous honeycomb structure including partition walls defining a plurality of cells acting as fluid passages which extend through the honeycomb structure from one end surface to the other end surface thereof, the plurality of cells comprises cells at first positions and cells at second positions, the first positions and the second positions are arranged alternately, the honeycomb structure being formed of at least one of:
(a) a catalytic substance comprising at least one of titania, tungsten oxide, vanadium oxide, and zeolite; and
(b) a substance comprising at least one oxide selected from the group consisting of alumina, ceria, titania, silica, and zirconia, and at least one noble metal carried on the at least one oxide and selected from the group consisting of silver, platinum, rhodium, and palladium, wherein pore diameter distribution of the partition walls is 0.2 to 0.6, an average pore diameter of said honeycomb structure is 40 μm or more, cells at the first positions include plugs at both ends of the fluid passages thereof, and cells at the second positions include plugs in a middle portion of the fluid passages thereof, wherein said method comprises the steps of:

performing extrusion molding a catalyst material in the form of a plastic body including at least one organic and inorganic pore forming agents mixed therein by using a ferrule to obtain a honeycomb-shaped catalyst material; and raising a temperature of the honeycomb-shaped catalyst material to a predetermined temperature during or after a drying process of the honeycomb-shaped catalyst material to remove said pore forming agent by oxidation or densify the pore forming agent to thus form fine pores in the partition walls.

* * * * *